W. HILL.
SPRING WHEEL.
APPLICATION FILED DEC. 2, 1911.
1,037,004.
Patented Aug. 27, 1912.
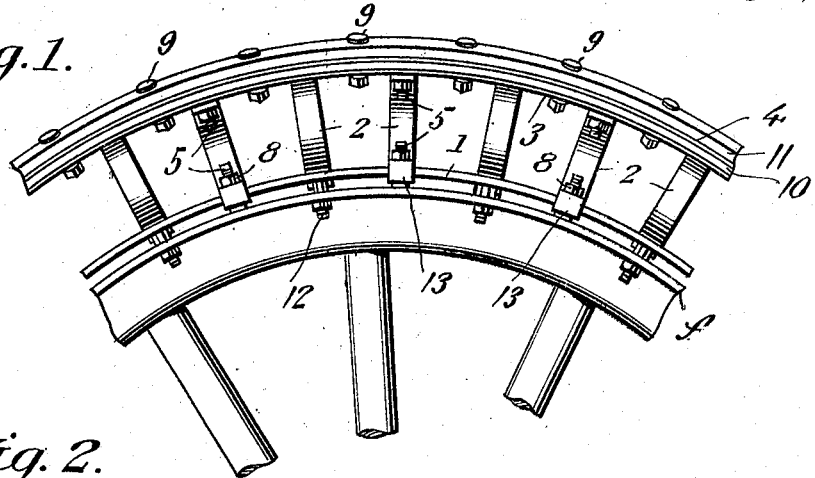
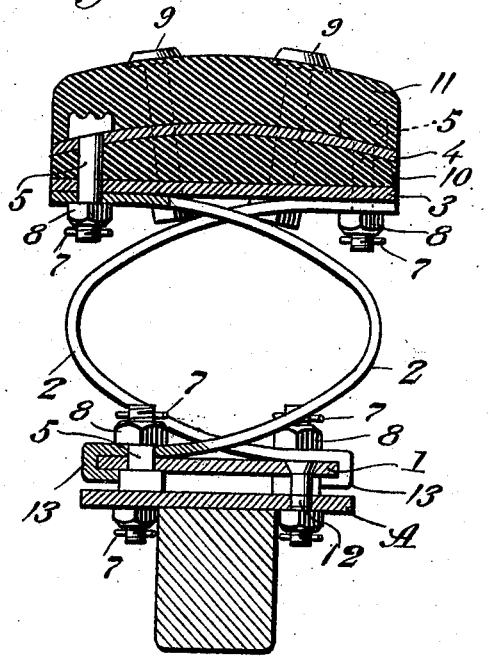
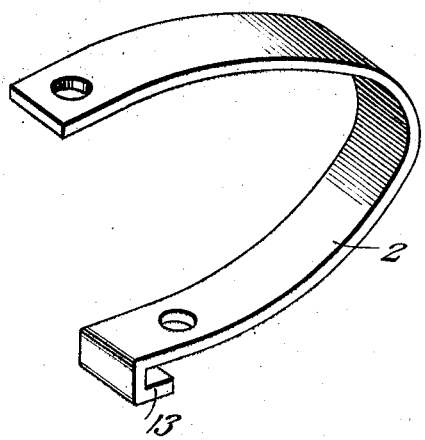
Witnesses
Geo. Ackman Jr.
V. B. Hillyard.
Inventor
Walter Hill
By Victor J. Evans
Attorney

UNITED STATES PATENT OFFICE.

WALTER HILL, OF MATTOON, ILLINOIS.

SPRING-WHEEL.

1,037,004. Specification of Letters Patent. Patented Aug. 27, 1912.

Application filed December 2, 1911. Serial No. 663,579.

*To all whom it may concern:*

Be it known that I, WALTER HILL, a citizen of the United States, residing at Mattoon, in the county of Coles and State of Illinois, have invented new and useful Improvements in Spring-Wheels, of which the following is a specification.

While the invention provides in effect a spring wheel of unique structure it nevertheless embodies a yieldable tire which is adapted to be applied to a vehicle wheel of any design to take the place of the ordinary pneumatic tire to secure ease and comfort in riding and to prevent wear upon machinery in the event of the vehicle being of the mechanically propelled type.

The invention contemplates a tire of peculiar formation embodying spaced inner and outer rims and interposed springs, the latter having an alternate and staggered arrangement and secured to the rims in a novel manner, the whole being of such structure as to enable a minimum number of parts being employed in the manufacture thereof.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a portion of a vehicle wheel embodying the invention. Fig. 2 is a transverse section. Fig. 3 is a detail view of one of the springs.

Corresponding and like parts are referred to in the following description, and indicated in all the views of the drawing, by the same reference characters.

Since the invention deals more particularly with the rim portion of the wheel the nature of the wheel *per se* is immaterial and will not be referred to other than to state that it may be of any make embodying a rim A.

The tire is yieldable and embodies a number of elements in its formation, said elements consisting of an inner rim 1, springs 2 and an outer rim 3. The rim 1 may be of any construction or outline in transverse section and is adapted to be bolted or otherwise secured to the rim of the vehicle wheel. The rim 3 is preferably constructed of spring metal and possesses a certain amount of resiliency so as to yield. The springs 2 are approximately of V form and are arranged transversely of the plane of the wheel or the rims 1 and 3, said springs having a staggered or alternate arrangement. The outer ends of the springs 2 rest against the inner side of the rim 3 and are secured thereto. The inner ends of the springs 2 are bent to provide hooks 13, which embrace the outer edges of the rim 1 to which they are bolted or otherwise fastened.

Corresponding and registering openings are formed in the ends of the springs 2 and the edge portions of the rims 1 and 3 and bolts 5 pass through these openings and serve to secure the springs to the respective parts 1 and 3. The heads of the bolts connecting the springs to the rim 1 engage the inner side of said rim and the hooked ends 13 of the spring engage the outer edges of the heads of the bolts, thereby preventing any possible turning of the bolts after the parts have been assembled. The heads of the bolts connecting the outer ends of the springs 2 with the rim 3 are ribbed or otherwise roughened and are embedded or engaged by the tread 11, thereby preventing turning of said outer bolts. All the bolts 5 receive nuts 8 and are formed with transverse openings through which cotter pins 7 pass, thereby preventing accidental loss of the nuts. A third rim 4 encircles the rim 3 and a filling 10 is interposed between the two rims 3 and 4, said filling being of rubber, canvas or like material. The rim 4 and filling 10 are secured to the rim 3 and outer ends of the springs 2 by means of the outer bolts 5. The tread 11 may be of rubber or other analogous material generally employed in the manufacture of soft tread tires. The tread 11 may be secured to the rim 4 in any manner. Bolts 9 pass through the tread 11 and through the parts 4, 10 and 3 and serve to secure all together. The heads of the bolts 9 project beyond the tread 11 and sustain the wear and act to prevent slipping or skidding of the vehicle provided with the improved tire.

It is proposed to construct the tires in standard sizes and to connect the same to the rims of the wheels by means of bolts 12 which pass through the inner rim 1 and the rim A of the wheel. The springs 2 may be of any strength and by reason of their formation and arrangement are capable of withstanding severe strain and in practice render the tire resilient to a degree to insure comfort and ease to the occupant of the vehicle and to prevent excessive wear upon the machinery of mechanically propelled vehicles.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A tire of the character described comprising inner and outer spaced rims, springs of approximately U form arranged transversely of the rims in staggered relation and secured thereto, the inner ends of the springs having hooks which embrace the edges of the inner rim, and bolts connecting the inner ends of the springs to the inner rim and having their heads engaged by the hooked ends of the springs to prevent turning of the bolts.

In testimony whereof I affix my signature in presence of two witnesses.

WALTER HILL.

Witnesses:
 P. N. HELLER,
 J. O. CHISNHALL.